(12) United States Patent
Chen et al.

(10) Patent No.: US 9,726,923 B2
(45) Date of Patent: Aug. 8, 2017

(54) TOUCH LIQUID CRYSTAL DISPLAY MODULE HAVING POLARIZER FILM COMPRISING COMPENSATING LAYER, POLARIZATION LAYER, AND POLARIZATION-PROTECTIVE LAYER

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaochuan Chen, Beijing (CN); Hailin Xue, Beijing (CN); Chuncheng Che, Beijing (CN); Lei Wang, Beijing (CN); Yanna Xue, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 14/388,620

(22) PCT Filed: Dec. 16, 2013

(86) PCT No.: PCT/CN2013/089487
§ 371 (c)(1),
(2) Date: Sep. 26, 2014

(87) PCT Pub. No.: WO2015/027625
PCT Pub. Date: Mar. 5, 2015

(65) Prior Publication Data
US 2015/0261027 A1    Sep. 17, 2015

(30) Foreign Application Priority Data
Aug. 30, 2013    (CN) .......................... 2013 1 0388713

(51) Int. Cl.
*G02F 1/1335*    (2006.01)
*G02F 1/1333*    (2006.01)
(Continued)

(52) U.S. Cl.
CPC .... *G02F 1/13338* (2013.01); *G02F 1/133514* (2013.01); *G06F 3/044* (2013.01);
(Continued)

(58) Field of Classification Search
CPC ........... G02F 1/13338; G02F 1/133528; G02F 2001/133562; G06F 3/0412; G06F 3/044
See application file for complete search history.

(56) References Cited

U.S. PATENT DOCUMENTS

| | | | |
|---|---|---|---|
| 6,624,936 B2* | 9/2003 | Kotchick | .......... G02F 1/133528 349/119 |
| 7,507,426 B2* | 3/2009 | Kim | .......... G02B 1/04 349/118 |

(Continued)

FOREIGN PATENT DOCUMENTS

| | | |
|---|---|---|
| CN | 101063921 A | 10/2007 |
| CN | 101833184 A | 9/2010 |

(Continued)

OTHER PUBLICATIONS

2nd office action issued in Chinese application No. 201310388713.5 dated Oct. 10, 2015.
(Continued)

*Primary Examiner* — Paisley L Arendt
(74) *Attorney, Agent, or Firm* — Nath, Goldberg & Meyer; Joshua B. Goldberg

(57) ABSTRACT

The present invention provides a touch LCM comprising an array substrate and a color film substrate provided opposite to each other, wherein an optical film set is provided at a side of the color film substrate away from the array substrate,
(Continued)

comprising a touch signal feedback layer, a touch signal receiving layer and an upper polarizer film provided there between. With the design of integrating the upper polarizer film, the touch signal feedback layer and the touch signal receiving layer into the optical film set, the optical film set has both the polarizing function in the conventional sense and the function of touch electrode.

16 Claims, 2 Drawing Sheets

(51) Int. Cl.
  *G06F 3/044* (2006.01)
  *G06F 3/041* (2006.01)
  *G02F 1/13363* (2006.01)
(52) U.S. Cl.
  CPC ........ *G06F 3/0412* (2013.01); *G02F 1/13363* (2013.01); *G02F 1/133528* (2013.01); *G02F 1/133536* (2013.01); *G02F 2001/133562* (2013.01); *G02F 2202/28* (2013.01)

(56) References Cited

U.S. PATENT DOCUMENTS

2002/0033920 A1  3/2002  Sun
2009/0315840 A1*  12/2009  Park .................... G02F 1/13338
                                                    345/173
2014/0016044 A1*  1/2014  Tung .................... G06F 3/0412
                                                    349/12

FOREIGN PATENT DOCUMENTS

| CN | 201600526 U | 10/2010 |
| CN | 101916154 A | 12/2010 |
| CN | 202018550 U | 10/2011 |
| CN | 102645772 A | 8/2012 |
| CN | 102778987 A | 11/2012 |
| CN | 202948426 U | 5/2013 |
| CN | 203084681 U | 7/2013 |
| CN | 103439823 A | 12/2013 |
| JP | 2001195186 A | 7/2001 |
| JP | 2002259054 A | 9/2002 |

OTHER PUBLICATIONS

Chinese Office Action dated Jun. 2, 2015 issued in corresponding Chinese Application No. 201310388713.5.
Written Opinion dated Jun. 11, 2014 issued in International Application No. PCT/CN2013/089487.
International Search Report from corresponding PCT application PCT/CN2013/089487.

* cited by examiner

TOUCH LIQUID CRYSTAL DISPLAY MODULE HAVING POLARIZER FILM COMPRISING COMPENSATING LAYER, POLARIZATION LAYER, AND POLARIZATION-PROTECTIVE LAYER

This is a National Phase Application filed under 35 U.S.C. 371 as a national stage of PCT/CN2013/089487, filed Dec. 16, 2013, an application claiming the benefit from Chinese Patent Application No. 201310388713.5, filed Aug. 30, 2013, the content of each of which is hereby incorporated by reference in its entirety.

FIELD OF THE INVENTION

The present invention relates to the field of display technology, and particularly, to a touch liquid crystal display module.

BACKGROUND OF THE INVENTION

With high-speed development of science and technology, electronic products have undergone great changes. In recent years, touch products, such as commercially available personal digital assistants (PDA), touch cellphones, tablet computers, portable notebook computers, etc., have been more and more popular since the advent of touch electronic products, because touch products are not only space-saving and portable, but also can be operated directly through a finger or a touch pen such that they are comfortable and easy to use. As many electronic product manufacturers have increased their investments in contact techniques, touch-sensitive devices are bound to be more widely applied in various fields in the future.

Especially, large-scale integration trend and popularity of touch liquid crystal display modules (touch LCM) are on the rise, which raises higher requirements on the production and manufacturing of the touch LCMs. A touch LCM is an assembly in which touch electrodes, a color filter, a liquid crystal layer, an array substrate, a control and drive circuit and a backlight module are assembled together. An existing touch LCM is made mainly by aligning a separately manufactured touch electrode with a polarizer film provided on the color film substrate and bonding the touch electrode with the polarizer film, and then capping the touch electrode with a cap. Such touch LCM has a large thickness, and furthermore misalignment phenomena generally occurs in the process of bonding the touch electrode and the polarizer film due to alignment errors, which may badly affect positioning of a touch point with the touch electrode, and result in poor touch effect. In addition, the existing touch LCM has complex manufacturing process and high manufacturing cost, which severely restricts the development of the touch LCM.

Therefore, in view of the above disadvantages, the present invention provides a new touch LCM.

SUMMARY OF THE INVENTION

An object of the present invention is to provide a touch LCM, and with the design in which an upper polarizer film, a touch signal feedback layer and a touch signal receiving layer are integrated into an optical film set, the touch LCM may solve the problem of high manufacturing cost and complex manufacturing process due to two sets of manufacturing processes required to manufacture the touch electrode and the upper polarizer film, respectively, in the prior art.

The object of the present invention is achieved by the following technical solution: a touch LCM, comprising an array substrate and a color film substrate provided opposite to each other, wherein an optical film set is provided at a side of the color film substrate away from the array substrate, and the optical film set comprises a touch signal feedback layer, a touch signal receiving layer and an upper polarizer film provided therebetween.

Further, the touch signal feedback layer is provided between the color film substrate and the upper polarizer film.

Further, the touch LCM further comprises a first bonding layer, through which the touch signal feedback layer is bonded with the color film substrate.

Further, the optical film set further comprises a surface processing layer; the touch signal receiving layer is provided between the upper polarizer film and the surface processing layer.

Further, the upper polarizer film comprises a compensating layer, a polarization layer and a polarization-protective layer; the polarization layer is provided between the polarization-protective layer and the compensating layer; and the polarization-protective layer is provided between the touch signal receiving layer and the polarization layer.

Further, the touch LCM further comprises a lower polarizer film which is provided at a side of the array substrate away from the color film substrate.

Further, the lower polarizer film comprises a compensating layer, a polarization layer and a polarization-protective layer; the polarization layer is provided between the compensating layer and the polarization-protective layer; and the compensating layer is provided between the array substrate and the polarization layer.

Further, the touch LCM further comprises a multilayer reflective polarizer film which is provided at a side of the lower polarizer film away from the array substrate.

Further, the touch LCM further comprises a second bonding layer through which the lower polarizer film is bonded with the array substrate, and a third bonding layer through which the multilayer reflective polarizer film is bonded with the lower polarizer film.

Further, the touch LCM further comprises a top cap which is provided at a side of the optical film set away from the color film substrate.

Further, the first, second and third bonding layers are made of pressure-sensitive adhesive.

Further, the compensating layer is made of a polymer material with negative birefringence; the polarization layer is made of polyvinyl alcohol, and the polarization protecting layer is made of triacetyl cellulose.

Compared to the prior art, the present invention has the advantages as below.

1. In the present invention, with the design of integrating the upper polarizer film, the touch signal feedback layer and the touch signal receiving layer into the optical film set, the optical film set not only achieves the polarizing function in the conventional sense, but also achieves the function of touch electrode (comprised of the touch signal feedback layer and the touch signal receiving layer); the touch electrode and the upper polarizer film which are manufactured in two sets of manufacturing processes, respectively, in the prior art can be manufactured by only one set of manufacturing process after integrated, such that the touch electrode may be better aligned with the color film substrate, so as to ensure accurate positioning of the coordinates of a touch point. Not only are manufacturing standards of the existing touch LCM satisfied, but also manufacturing cost is significantly lowered and manufacturing process is simplified.

2. the touch signal receiving layer and the touch signal feedback layer which are provided at the upper and lower surfaces of the upper polarizer film, respectively, in the embodiment may take the upper polarizer film as an insulating layer therebetween, so as to avoid signal crosstalk between the touch signal receiving layer and the touch signal feedback layer, which ensures the accurate collection of coordinates of touch points and improves touch accuracy. Meanwhile, the thickness of the touch LCM is effectively reduced by replacing the insulating layer sandwiched between the touch signal receiving layer and the touch signal feedback layer in the touch electrode of the prior art with the upper polarizer film.

BRIEF DESCRIPTION OF THE DRAWINGS

The present invention is further described in conjunction with the accompany drawings and embodiments below.

DETAILED DESCRIPTION OF THE EMBODIMENTS

Figure 1:
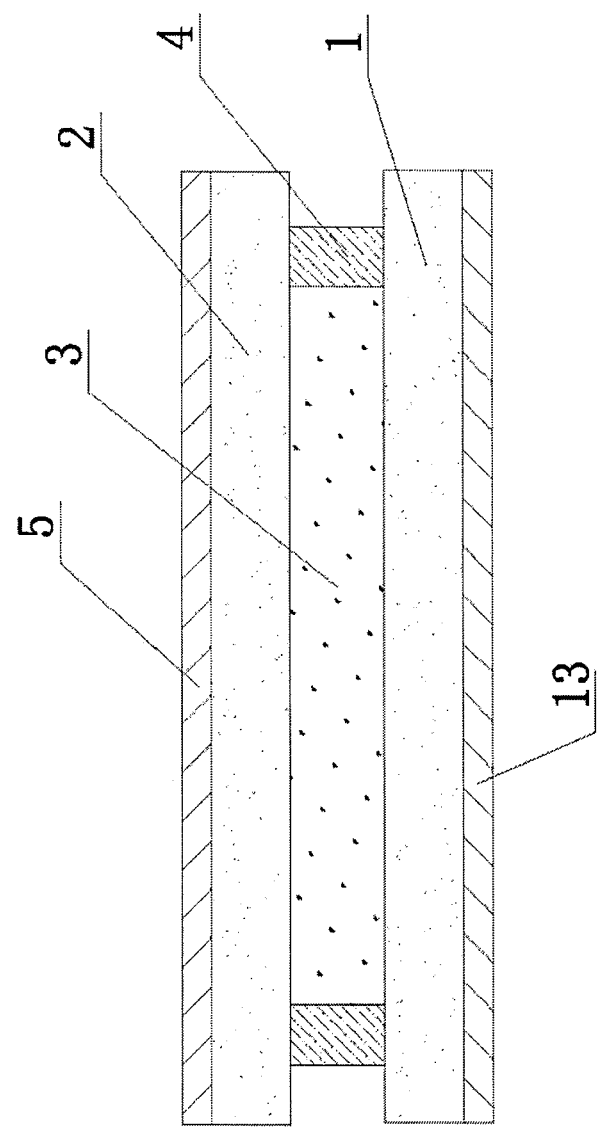
FIG. 1 is a schematic diagram (sectional view) of a structure of a touch LCM in an embodiment of the present invention.

Referring to FIG. 1, the present invention provides a touch LCM, comprising an array substrate 1 and a color film substrate 2 provided opposite to each other, a backlight module (prior art, not shown in Figures) and a liquid crystal layer 3 sealed between the array substrate 1 and the color film substrate 2; wherein the backlight module is provided below the array substrate, that is, provided at a side of the array substrate 1 away from the color film substrate 2, the color film substrate is aligned with and attached to the array substrate below the color film substrate in vacuum to form a cell through spacers (prior art, not shown in Figures) and sealant 4 provided around the edges of the lower surface of the color film substrate; and an optical film set 5 is provided at a side of the color film substrate 2 away from the array substrate 1.

Figure 2:
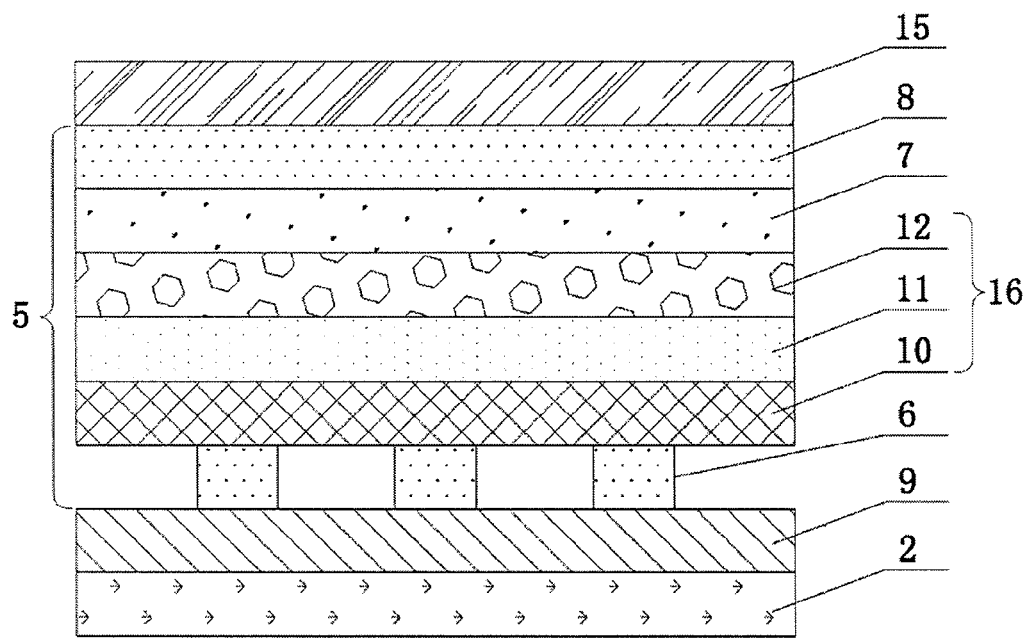
FIG. 2 is a schematic diagram (sectional view) of a structure of an optical film set in an embodiment of the present invention.

As illustrated in FIG. 2, the optical film set 5 includes a touch signal feedback layer 6, a touch signal receiving layer 7 and an upper polarizer film 16 provided between the touch signal feedback layer 6 and the touch signal receiving layer 7, and the touch signal feedback layer 6 is provided between the color film substrate 2 and the upper polarizer film 16. Here, both the touch signal feedback layer 6 and the touch signal receiving layer 7 are connected to an external master control circuit (prior art, not described in detail), which receives coordinates of a touch point collected by touch electrodes formed by the touch signal feedback layer 6 and the touch signal receiving layer 7, and, based on the coordinates of the touch point, analyses and edits a pixel driving signal which is then transmitted to a IC drive circuit so as to control TFTs corresponding to the pixel driving signal in the array substrate to drive liquid crystal at a position corresponding to the touch point to display picture. Here, a specific method used to collect the coordinates of the touch point by the touch electrodes is as below. The touch signal receiving layer 7 is used for receiving pulse signals, and when a scanning pulse signal is applied to one of signal feedback lines on the touch signal feedback layer, the other feedback lines are grounded, and meanwhile voltage or charge detecting is performed on signal receiving lines on the touch signal receiving layer 7 line by line. After the detecting is finished, a change in capacitance value at the touch point may be detected, and the external master control circuit may obtain the specific position of the touch point on the LCM by calculation, thus obtaining the coordinates of the touch point.

Both the touch signal feedback layer 6 and the touch signal receiving layer 7 are made of ITO (Indium tin oxide), and a plurality of signal feedback lines and signal receiving lines are formed on the touch signal feedback layer 6 and the touch signal receiving layer 7, respectively, by photolithographic process and etching process. The most common pattern of touch electrodes is a pattern formed by a plurality of bar-like signal feedback lines and a plurality of bar-like signal receiving lines perpendicularly intersecting with each other. The metal wires used to connect the touch electrodes with the external master control circuit may made of a metal with a small resistance value such as silver, aluminum, copper, etc, and its length may be controlled between 50 μm and 200 μm.

Details of the specific structures and functions of the touch signal feedback layer 6 and the touch signal receiving layer 7 in this embodiment belong to the prior art, and details of the specific structure and function of the touch electrodes formed by the touch signal feedback layer 6 and the touch signal receiving layer 7 also belong to the prior art, and therefore they are not elaborated herein.

In the present invention, with the design of integrating the upper polarizer film 16, the touch signal feedback layer 6 and the touch signal receiving layer 7 into the optical film set 5, the optical film set 5 not only has the polarizing function in the conventional sense, but also has the function of touch electrodes; the touch electrode and the upper polarizer film which are manufactured in two sets of manufacturing processes, respectively, in the prior art can be manufactured by only one set of manufacturing process after integrated, such that the touch electrode may be better aligned with the color film substrate, so as to ensure accurate positioning of the coordinates of the touch point. Not only are manufacturing standards of the existing touch LCM satisfied, but also manufacturing cost is significantly lowered and manufacturing process is simplified.

Furthermore, the touch signal receiving layer 7 and the touch signal feedback layer 6 provided at the upper and lower surfaces of the upper polarizer film 16, respectively, in the embodiment may take the upper polarizer film 16 as an insulating layer therebetween, so as to avoid signal crosstalk between the touch signal receiving layer 7 and the touch signal feedback layer 6, which ensures the accurate collection of coordinates of touch points and improves touch-sensing accuracy. Meanwhile, the thickness of the touch LCM is effectively reduced by replacing the insulating layer sandwiched between the touch signal receiving layer and the touch signal feedback layer in the touch electrode of the prior art with the upper polarizer film 16.

As illustrated in FIG. 2, the optical film set 5 in this embodiment further includes a surface processing layer 8; the touch signal receiving layer 7 is provided between the upper polarizer film 16 and the surface processing layer 8. Here, the touch signal feedback layer 6 is bonded with the color film substrate 2 through the bonding layer 9.

The upper polarizer film 16 in this embodiment includes a compensating layer 10, a polarization layer 11 and a polarization-protective layer 12 which are sequentially provided from bottom to top, and the direction of "from bottom to top" refers to a direction in which the upper polarizer film 16 goes away from the color film substrate 2. The touch signal feedback layer 6 is provided between the bonding layer 9 and the compensating layer 10; the touch signal receiving layer 7 is provided between the polarization-protective layer 12 and the surface processing layer 9.

The bonding layer 9 may be made of pressure-sensitive adhesive and used for bonding the whole optical film set 5 with the color film substrate 2; curvature of the color film substrate 2 may be adjusted by controlling the adhesion performance of the bonding layer 9.

The compensating layer 10 in this embodiment may be made of a polymer material with negative birefringence such as smectic liquid crystal, so as to counteract phase delay resulted from birefrigent effect of liquid crystal in the liquid crystal layer 3, thus improving viewing angle and chromaticity of the touch LCM. With the compensating layer 10, viewing angle dependency and wavelength dependency of the touch LCM may be eliminated, thus achieving high contrast and high color reproduction.

The polarization layer 11 in this embodiment may be made of polyvinyl alcohol, and may cause the light passing therethrough to be linearly polarized. As polyvinyl alcohol has features of strong bonding, obdurability, smoothness, oil resistance, solvent resistance, protective colloid, gas interdiction, abrasion resistance, as well as water resistance as being specially treated, etc., and thus it is also used as adhesive between the compensating layer 10 and the polarization protection layer 12.

The polarization-protective layer 12 in this embodiment is used for protecting the polarization layer 11 and used as inner protective shell of the touch signal receiving layer 7. The polarization-protective layer 12 may be made of TAC (Triacetyl Cellulose).

The surface processing layer 8 in this embodiment is used as outer protective shell of the touch signal receiving layer 7. The surface processing layer 8 may be made of rigid plastic, to enhance its ability to resist scratches; alternatively, the surface processing layer 8 may also be made of high definition glass such as AG, LR, AR, etc. so as to improve overall visual impression of the touch LCM.

Figure 3:
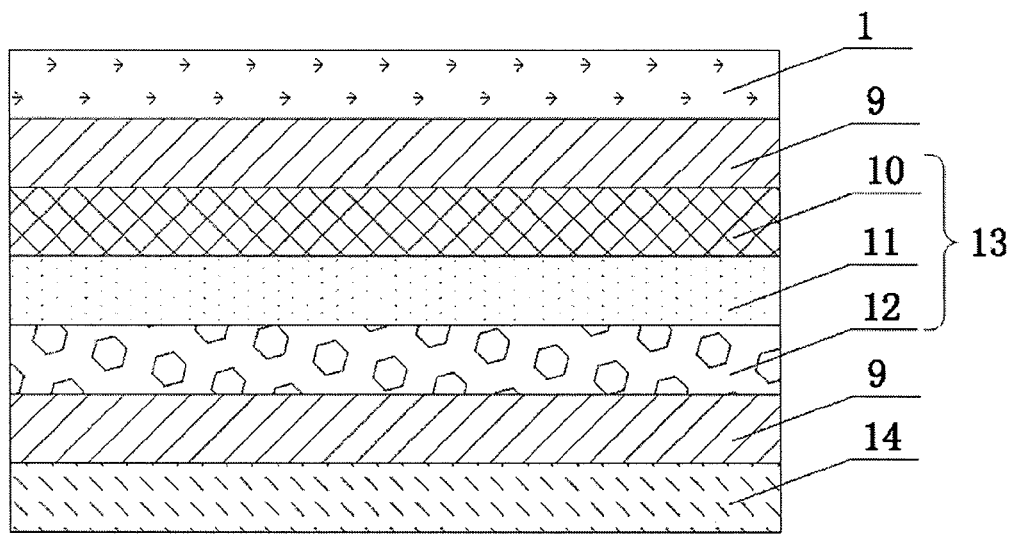
FIG. 3 is a schematic diagram (sectional view) of a lower polarizer film in an embodiment of the present invention.

Referring to FIGS. 1 and 3, a lower polarizer film 13 may be further provided at a side of the array substrate 1 away from the color film substrate 2, and is provided between the array substrate 1 and a backlight module (not shown in Figures). Light irradiated into the array substrate 1 from the backlight module experiences an adjustment by the lower polarizer film 13 to further ensure the linearly polarizing effect of light.

The lower polarizer film 13 has the same structure as the upper polarizer film 16, and specifically, includes a compensating layer 10, a polarization layer 11 and a polarization-protective layer 12 which are sequentially provided from top to bottom, and the direction of "from top to bottom" refers to a direction in which the lower polarizer film 13 goes away from the array substrate 1. The compensating layer 10 is bonded to the array substrate 1 through a bonding layer 9. The compensating layer 10, the polarization layer 11 and the polarization-protective layer 12 included in the lower polarizer film 13 have the same structures, materials and functions as those included in the upper polarizer film 16, respectively, and therefore are not elaborated herein.

In the embodiment, a multilayer reflective polarizer film 14 (Advanced Polarizer Film (APF)) is provided below the polarization-protective layer 12 of the lower polarizer film 13, that is, the multilayer reflective polarizer film 14 is provided at a side of the polarization-protective layer 12 away from the array substrate 1. The multilayer reflective polarizer film 14 is bonded with the polarization-protective layer 12 of the lower polarizer film 13 through a bonding layer 9, and provided between the lower polarizer film 13 and the backlight module, which may improve the utilization of backlight from the backlight module by more than 30%, thus achieving the purposes of saving energy and extending service life of batteries.

Referring to FIG. 2, the touch LCM in this embodiment further includes a top cap 15, which is provided at a side of the optical film set 5 away from the color film substrate 2, and is made of transparent rigid glass, and the top cap 15 is used for packaging the whole optical film set 5, the color film substrate 2, the array substrate 1 and the backlight module into a whole.

The above description explains merely some preferred implementations of the present invention, it should be noted that for those skilled in the art, various improvements and variations may be made without departing from the technical principle of the present invention, and these improvements and variations should also be considered as the protection scope of the present invention.

The invention claimed is:

1. A touch liquid crystal display module, comprising an array substrate and a color film substrate provided opposite to each other; wherein an optical film set is provided at a side of the color film substrate away from the array substrate, and the optical film set comprises a touch signal feedback layer, a touch signal receiving layer and an upper polarizer film provided therebetween;

wherein the touch liquid crystal display module further comprises a lower polarizer film which is provided at a side of the array substrate away from the color film substrate, and a multilayer reflective polarizer film which is provided at a side of the lower polarizer film away from the array substrate; and wherein the upper polarizer film comprises a compensating layer, a polarization layer, and a polarization-protective layer; the polarization layer is provided between and in direct contact with the polarization-protective layer and the compensating layer; and the polarization-protective layer is provided between the touch signal receiving layer and the polarization layer.

2. The touch liquid crystal display module of claim 1, wherein the touch signal feedback layer is provided between the color film substrate and the upper polarizer film.

3. The touch liquid crystal display module of claim 2, wherein the optical film set further comprises a surface processing layer; the touch signal receiving layer is provided between the upper polarizer film and the surface processing layer.

4. The touch liquid crystal display module of claim 3, further comprising a top cap which is provided at a side of the optical film set away from the color film substrate.

5. The touch liquid crystal display module of claim 2, further comprising a top cap which is provided at a side of the optical film set away from the color film substrate.

6. The touch liquid crystal display module of claim 1, further comprising a first bonding layer, through which the touch signal feedback layer is bonded with the color film substrate.

7. The touch liquid crystal display module of claim 6, further comprising a top cap which is provided at a side of the optical film set away from the color film substrate.

8. The touch liquid crystal display module of claim 6, wherein the first bonding layer is made of pressure-sensitive adhesive.

9. The touch liquid crystal display module of claim 1, wherein the lower polarizer film comprises a compensating layer, a polarization layer and a polarization-protective layer; the polarization layer is provided between the compensating layer and the polarization-protective layer; and the compensating layer is provided between the array substrate and the polarization layer.

10. The touch liquid crystal display module of claim 9, further comprising a top cap which is provided at a side of the optical film set away from the color film substrate.

11. The touch liquid crystal display module of claim 9, wherein the compensating layer is made of a polymer material with negative birefringence; the polarization layer is made of polyvinyl alcohol, and the polarization protecting layer is made of triacetyl cellulose.

12. The touch liquid crystal display module of claim 1, further comprising a second bonding layer through which the lower polarizer film is bonded with the array substrate, and a third bonding layer through which the multilayer reflective polarizer film is bonded with the lower polarizer film.

13. The touch liquid crystal display module of claim 12, further comprising a top cap which is provided at a side of the optical film set away from the color film substrate.

14. The touch liquid crystal display module of claim 12, wherein the second and third bonding layers are made of pressure-sensitive adhesive.

15. The touch liquid crystal display module of claim 1, further comprising a top cap which is provided at a side of the optical film set away from the color film substrate.

16. The touch liquid crystal display module of claim 1, wherein the compensating layer is made of a polymer material with negative birefringence; the polarization layer is made of polyvinyl alcohol, and the polarization protecting layer is made of triacetyl cellulose.

* * * * *